United States Patent [19]
Carreras

[11] 3,715,103
[45] Feb. 6, 1973

[54] GEAR AND CAPSTAN GUARD FOR FLIGHT CONTROL SERVO

[75] Inventor: Luis Enrique Carreras, Ft. Lauderdale, Fla.

[73] Assignee: The Bendix Corporation

[22] Filed: June 24, 1971

[21] Appl. No.: 156,224

[52] U.S. Cl. ............254/150 R, 254/186, 242/157 R
[51] Int. Cl. ...............................................B66d 1/30
[58] Field of Search .....254/150, 186, 190; 242/84.5, 242/156.1, 157

[56] References Cited

UNITED STATES PATENTS 2,533,592  12/1950  Landon ..............................254/190
3,645,503   2/1972  Doerfling........................254/190 R

*Primary Examiner*—Harvey C. Hornsby
*Attorney*—Bruce L. Lamb et al.

[57] ABSTRACT

A capstan pulley coaxially driven through a slip clutch by a first gear which in turn is driven by a second gear. A gear guard which covers the gear train so as to prevent a capstan cable from becoming enmeshed therein includes a plurality of lock tab slots which cooperate with a capstan guard to permit the capstan guard to be locked over the capstan in any one of a plurality of positions.

4 Claims, 4 Drawing Figures

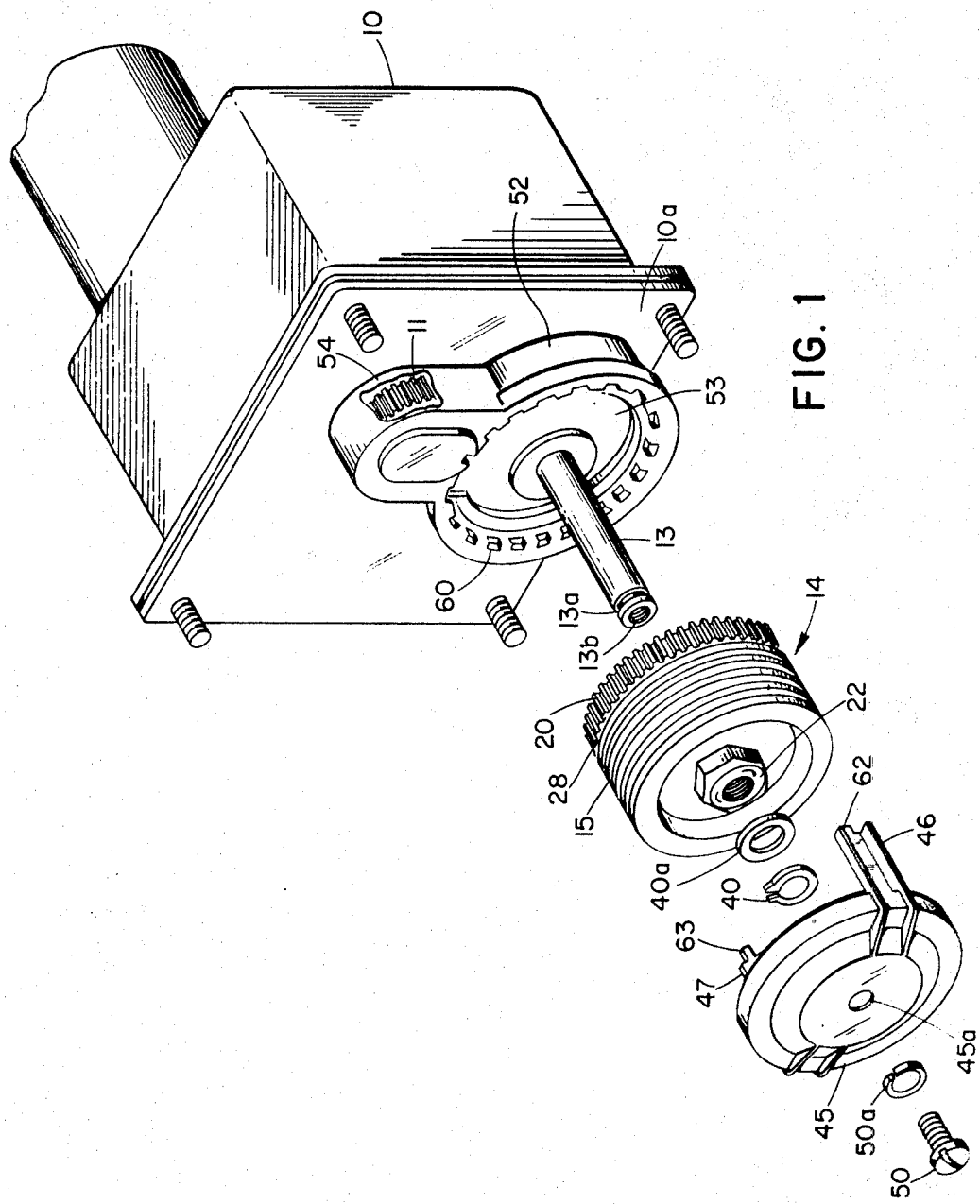

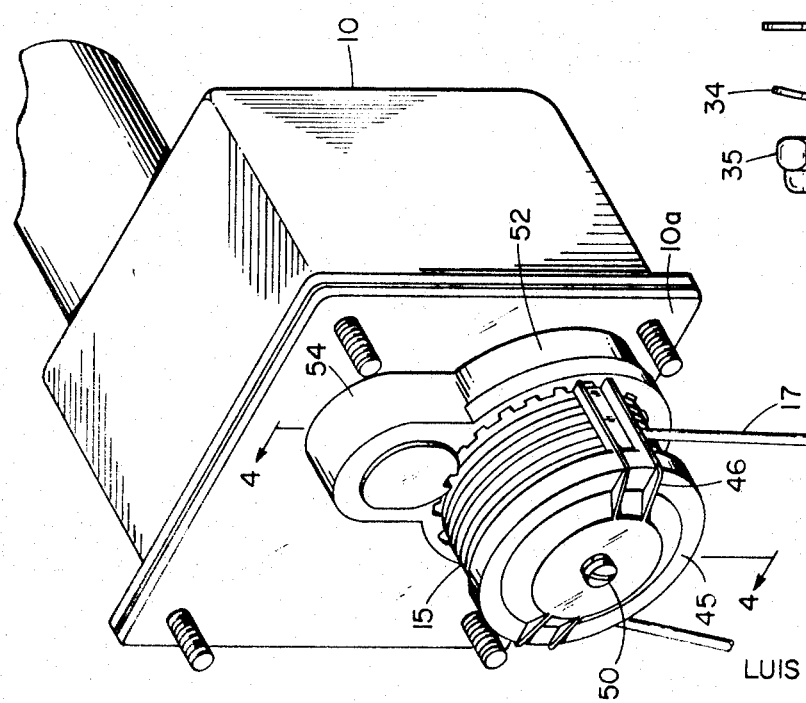
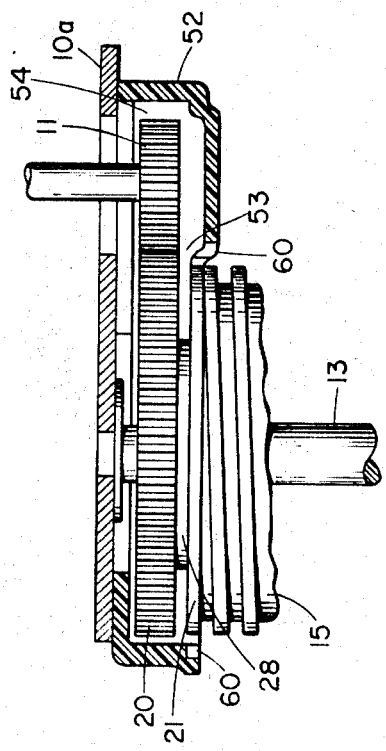
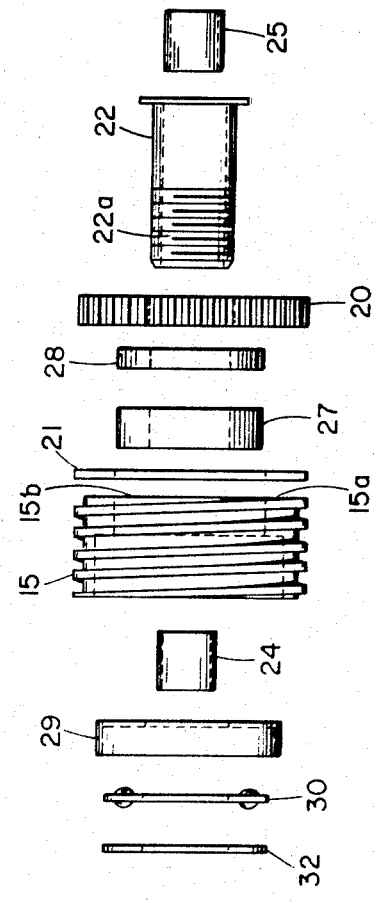
INVENTOR
LUIS ENRIGUE CARRERAS
BY William G. Christoforo
ATTORNEY

GEAR AND CAPSTAN GUARD FOR FLIGHT CONTROL SERVO

BACKGROUND OF THE INVENTION

This invention relates to improvements in capstans and is more particularly applicable to capstans which are used in the operation of remote mechanical aircraft mechanisms by means of cables.

Remote control cables are generally used in aircraft to transmit motion from a prime mover such as a servo motor to the various aircraft mechanisms such as control surfaces. These control cables are generally connected to the prime mover through a capstan.

It is an object of this invention to provide a capstan guard which will prevent the cables wound about the capstan from being inadvertently removed.

It is another object of this invention to provide a capstan guard which will not only captivate a cable on the capstan but will also prevent the cable from becoming enmeshed in the gear train driving the capstan.

A further object of the invention is to provide a capstan guard which is easily adjustable to any angle of cable entry and take off.

This invention consists of improvements for use with aircraft cable drive capstans which will prevent the servo cable driven by the capstan from becoming entangled in the servo pinion gear or the capstan gear, these latter gears driving the capstan. The capstan guard also prevents the cable from unwinding from the capstan. The invention is particularly useful in that it permits setting the capstan guard in a plurality of positions over the capstan, making it universally adaptable for use at any location in an aircraft. This is accomplished by the use of tabs on the capstan guard which fit into a choice of slots located around the gear guard. At the time of installation, the capstan guard is positioned to conform to the direction from which the cable exits the capstan.

The invention is more fully understood by reference to the drawings wherein:

FIG. 1 shows an exploded view of the invention.

FIG. 2 shows the invention in prospective elevation.

FIG. 3 shows an exploded view of the capstan assembly.

FIG. 4 is a sectional view taken along line 4—4 of FIG. 2.

Refer to the figures wherein like reference numerals refer to like elements, and refer particularly to FIG. 1. A servo mechanism generally designated at 10 includes a servo pinion gear 11 which provides the output motion therefrom. A stationary gear post 13 is spaced apart from servo pinion gear 11 and is fastened at one end to end plate 10a of servo mechanism 10. A capstan assembly 14, adapted for rotation on gear post 13 includes a capstan body 15 which has a helical cable race on the exterior circumference thereof adapted for driving a cable. Capstan assembly 14 is seen in greater detail in FIG. 3, reference to which should now also be made. A spur gear 20 adapted for meshing with servo pinion gear 11 is fixedly attached to a hollow capstan shaft 22 having an externally threaded section 22a at the end opposite gear 20. The bore in shaft 22 is adapted to receive sleeve bearings 24 and 25 which in turn are adapted for a snug rotatable fit on gear post 13 (FIG. 1) whereby gear 20 and shaft 22 are rotated thereon. Capstan body 15 is seen to be generally cup shaped having a bottom portion 15a in which is disposed a hole 15b concentric with the capstan body. Another sleeve bearing 27 has an outside diameter adapted to be received in hole 15b and an inside diameter adapted for receiving capstan shaft 22. Capstan body 15 is assembled to sleeve bearing 27 which is further slipped over capstan shaft 22. A disc 28 of friction material is sandwiched between the capstan body and gear 20. A washer 21, whose purpose will be explained below, has an outside diameter equal to the outside diameter of capstan body 15 and an inside diameter large enough for sleeve bearing 27 to pass therethrough. Washer 21 is fastened to the bottom surface 15a of capstan body 15.

A thrust bearing washer 30 sandwiched between washers 29 and 32 is positioned on shaft 22 within the cup portion of capstan body 15. A belleville washer 34 is placed on shaft 22 and deflected by adjustment of nut 35 on screw threads 22 whereby normal force adjustment a friction drive is provided between gear 20 and capstan body 15.

Returning now to FIG. 1 it can be seen that capstan assembly 14 may now be assembled on gear post 13 for rotation thereon. The capstan assembly is captured on the gear post through the use of a standard spring washer 40 and wear washer 40a positioned in groove 13a. A capstan guard 45 having diametrically opposed dependent arms 46 and 47 is adapted to be placed over capstan assembly 14 and fastened to gear post 13 by screw 50 and lock washer 50a fastened through a hole 45a concentric on the longitudinal axis of the capstan guard and into concentrically threaded bore 13b of gear post 13.

A gear guard 52, generally in a figure-eight form is fastened to plate 10a and includes a large bore section 53 concentric with gear post 13 which is adapted to receive gear 20. A smaller gear guard bore 54 is adapted to receive servo pinion gear 11.

FIG. 4 shows the gear guard 52 in cross section taken along line 4—4 of FIG. 2. Also shown in proper position are servo pinion 11, capstan gear 20, friction material 28, capstan body 15, partially cut away, and gear post 13. It can be seen how servo pinion gear 11 fits within bore 54 while capstan gear 20 meshes therewith within bore 53. Also note that aforementioned washer 21 effectively closes bore 53 to thereby prevent the capstan cable from becoming enmeshed in the gear train. Also note lock tab slots 60 shown here and in FIG. 1 on the outer edge of bore 53.

Returning to FIG. 1 it can be seen that a plurality of the lock tabs 60 are disposed about bore 53. A diametrically opposed pair of lock tab slots 60 receive lock tabs 62 and 63 of capstan guard 45 to thereby lock dependent arms 46 and 47 in place. It can be seen that by removing screw 50 capstan guard might be oriented in any rotated position to thereby permit any angle of capstan cable entry and take off while simultaneously captivating the cable on the capstan.

FIG. 2 shows the invention fully assembled and reference thereto should now be made. In particular, there is seen servo 10, gear guard 52, capstan assembly 14, capstan guard 45 and cable 17 captivated thereby.

The invention claimed is:

1. In an aircraft capstan drive for a capstan cable including a capstan body which engages said cable, said body being coaxial with and driven by a first gear, said first gear driven in turn by a second gear, said first and second gears comprising a gear train, an improvement comprising:

a gear guard for covering said gear train without hindering operation thereof, said gear guard having a first bore for substantially containing said first gear and second bore for substantially containing said second gear, said first bore being substantially cup-shaped and having an outer lip, said outer lip having disposed therein so as to encircle said first bore a plurality of slots; and, a capstan guard having a generally flat top section and at least two dependent arms, each arm terminating in a lock tab which cooperates with one of said slots, said capstan guard being disposed on said capstan body with said arms adjacent said body to thereby captivate said cable on said capstan body.

2. The improvement of claim 1 wherein said capstan body has an outside diameter larger than the outside diameter of said first gear and is disposed snugly with said first bore to thereby effectively close said bore.

3. The improvement of claim 2 wherein said capstan body is driven by said first gear through a slip clutch.

4. The improvement of claim 2 with additionally adjustable slip clutch means located within said capstan body, said first gear driving said capstan body through said adjustable slip clutch.

* * * * *